United States Patent
Kastalsky

(10) Patent No.: US 7,362,492 B2
(45) Date of Patent: Apr. 22, 2008

(54) ELECTRONIC BOOK DISPLAY BASED ON BI-STABLE ELECTROSTATIC SHUTTERS

(76) Inventor: Alexander Kastalsky, 3 Kenneth Dr., Wayside, NJ (US) 07712

( * ) Notice: Subject to any disclaimer, the term of this patent is extended or adjusted under 35 U.S.C. 154(b) by 430 days.

(21) Appl. No.: 11/073,476

(22) Filed: Mar. 7, 2005

(65) Prior Publication Data

US 2006/0197739 A1    Sep. 7, 2006

(51) Int. Cl.
*G02B 26/00* (2006.01)
*G02B 26/08* (2006.01)

(52) U.S. Cl. ................................. 359/290; 359/298
(58) Field of Classification Search .................. 359/290
See application file for complete search history.

(56) References Cited

U.S. PATENT DOCUMENTS 5,790,088 A * 8/1998 Johnson et al. ................ 345/84
6,034,807 A * 3/2000 Little et al. ................... 359/227

* cited by examiner

*Primary Examiner*—Jordan Schwartz
*Assistant Examiner*—James C Jones

(57) ABSTRACT

A flat panel display is proposed wherein each pixel contains two membranes, covering the entire pixel area, which under the force of electrostatic attraction rotate from their original position parallel to the substrate plane into a final position normal to the substrate plane, thereby altering the optical state of the pixel. The electrostatic force is applied only to narrow conductive strips placed on the membrane sides and rotates the membranes around torsion hinges attached to the membranes through flexible and conductive belts. Two membranes per pixel, turned toward each other in their upright position, increase the viewing angle of the display. Further increase of the viewing angle is based on making both the bottom membrane surface and the pixel interior black. Another disclosed feature in the pixel design is placement of an additional pillar located in the area of the membrane hinges to both facilitate the membrane rotation under the electrostatic force and hold the membrane in the upright position.

3 Claims, 4 Drawing Sheets

ELECTRONIC BOOK DISPLAY BASED ON BI-STABLE ELECTROSTATIC SHUTTERS

The present patent is an improved version of the US patent previously submitted under the title "Display device based on bi-stable electrostatic shutter", filed on Apr. 12, 2004, application Ser. No. 10/822,830.

FIELD OF THE INVENTION

The present invention relates to the bi-stable electrostatic optical shutter, and more particularly, to the flat panel display containing two-dimensional array of these shutters.

BACKGROUND OF THE INVENTION

The electrostatic optical modulator employing a resilient electrode moving over a static electrode has been a subject of multiple patents and publications. The difference between these modulators originates essentially from the shape of electrodes involved as well as the direction and spatial limitations of movement of the flexible electrode relative to the static electrode, see e.g. U.S. Pat. Nos. 4,229,075; 4,208,103 and 4,786,149. Lateral membrane movement is used in optical shutter and display of U.S. Pat. No. 6,288,824, wherein the electrostatically moved membrane and static electrode consist of periodic metal stripes, so that lateral membrane movement opens or closes multiple slits to pass or shut the light. Another approach, see U.S. Pat. No. 6,600,474, relies on a flipping of the membrane by 180 degrees, and latching it at this position by an electrostatic force. No resilient force is applied, since the membrane freely turns around the hinges between two extreme positions.

Various examples of the electrostatic optical modulators are based on the field induced bending of a cantilever membrane which is moved toward a flat static electrode, thereby changing the optical state, see U.S. Pat. Nos. 3,553,364; 3,600,798; 4,229,732; 4,731,670 and 5,781,331. Another approach relies on an electro-statically induced twisting of the membrane mirror from its initial flat position to vary the optical reflection, see U.S. Pat. Nos. 3,746,911 and 4,710,732. This electrostatic optical modulator, known as Deformable Mirror Device (DMD), is currently commercially used in a projection display.

The DMD represents a matrix of densely packed mirrors reflecting light into the objective lens when the pixels are unbiased ("on state") and moving the reflected light out of the objective lens when they are electrostatically tilted by ~10 degrees ("off state"). The limitations of application of the DMD strictly to projection display originates from small tilt of the membrane, since 10 degree rotation is not enough to use the DMD pixels for the flat panel displays. In the proposed shutter and display, according to the present invention, this limitation is lifted due to different pixel design which allows for membrane tilt of 90 degrees, thereby making it suitable for application to the flat panel displays.

In the original design of the previous patent on this subject, shown in FIG. 1 as a prior art, the shutter contains a membrane disposed over and separated from the substrate by an air gap, see cross-sectional view of the pixel in FIG. 1a. The membrane is held parallel to the substrate by four pillars grown on the substrate. The pillar height controls the air gap space. Two left pillars support the membrane through conductive belts attached to the membrane, see FIG. 1b, where the top view of the pixel is shown, while two other pillars support the membrane at its opposite side.

In the original design, the membrane consisted of several layers:

the bottom conductive layer connected to two supporting pillars through the conductive belts;

the insulator above the bottom conductive layer; and the top layer having high optical reflectivity in one shutter embodiment and black, light absorbing surface in another, see below.

The top layer is isolated form the bottom conductive layer on the membrane and does not participate in the process of electrical activation of the shutter. The bottom conductive layer of the membrane, made as a conductive stripe, about a few μm wide and connected to two membrane supporting hinges, occupies a small portion of the membrane and serves as one of the electrodes for electric field induced membrane movement. This layer is shifted to one of the sides of the membrane and thus positions the membrane asymmetrically relative to the membrane supporting hinges.

The second controlling electrode is also made in the shape of a narrow metal stripe and placed on the substrate underneath and parallel to the bottom conductive layer of the membrane, see FIG. 1a. When a potential difference is applied between the bottom conductive layer on the membrane and the second electrode on the substrate, the electrostatic force rotates the membrane around the membrane hinges to reduce the distance between the active electrodes. If the air gap is deep enough to accommodate the width of the narrow part of the membrane containing the membrane electrode, at sufficient voltage the membrane starts rotating and eventually reaches the position normal to the substrate plane, thereby fully opening the shutter to pass the light or drastically change the shutter reflection, see FIG. 1c. Thus, unlike the previously discussed DMD, having small rotation angle for the membrane, the proposed shutter allows for a large shutter opening and therefore can be used for fabrication of the flat panel display.

In the previous patent, a bi-stability effect, based on the existence of two different voltages needed to bring the membrane into upright position and to hold the membrane in the upright position, have been discussed and used for building appropriate driving circuitry of the display comprising a two-dimensional matrix of these shutters. Two- and three-electrode pixel structures were proposed and analyzed. In the present patent, we will not discuss these issues and focus on display improvements introduced according to the present invention.

SUMMARY OF THE INVENTION

Previous description of the shutter and the display submitted and filed as US patent under the title "Display device based on bi-stable electrostatic shutter", pertains to a new approach in making an electrostatically bi-stable optical shutter and a flat panel display employing such shutters. In the previous design, the matrix of membranes, tilted to the upright position, limits the viewing angle for observation of the pixel interior. The present extension of this patent describes a new design of the pixel matrix which allows increasing of the viewing angle of the display. New pixel design also employs an additional pillar to both facilitate the membrane tilt and hold the membrane in its upright position.

It is therefore an object of the present invention to introduce a new design of the pixel matrix having larger viewing angle in comparison with the previously proposed matrix design.

Another object of the present invention is to modify the pixel design to improve the ability of the pixel membrane to turn under the applied voltage as well as to hold the membrane in the activated, "on"-state.

When the membrane is tilted to its final position normal to the substrate plane ("on"-state), it limits the pixel view within the plane of the membrane rotation. If, for example, all the membranes are tilted up and have their planes parallel to vertical and normal to the substrate plane, the view of each pixel will be limited from both viewing sides within horizontal and normal to the substrate plane. Beyond a certain angle, the opened area of the pixel becomes completely invisible.

New pixel designs, according to the present invention, increase the viewing angle by the following display modifications:

a. The pixel membrane is subdivided into two equal pieces, both having their individual supporting hinges and active electrodes located at the opposite ends of the pixel area, so that the membranes in the upright position (on-state) face each other. Twice smaller height of the membranes provides larger viewing angle. In addition, two membranes in the on-state, together with the substrate surface underneath the membranes, form an enclosed pixel interior, so that the pixel viewing angle does not depend on the optical state of the neighboring pixels.

b. The bottom surfaces of the membranes are made either mirror-like or of the same color as the pixel interior underneath the membrane, depending on the display operation mode, thereby increasing the visible area of the pixel interior when the membranes are in the upright position.

It is important that within the plane parallel to the membrane planes in their upright position, the viewing angle does no have any limitations and essentially equal to 180°.

The membrane plane in the "on"-state can be made parallel to either horizontal or vertical direction. For the book reading process, it seems preferable to maximize the viewing angle in the vertical plane and therefore make the membrane planes in the "on"-state parallel to the vertical plane.

Another improvement also relates to a new pixel design. The pixel structure is altered, according to the present invention, by forming an additional pillar on the substrate near the metal electrode at the membrane edge. This pillar is introduced to facilitate the membrane rotation into its upright position. In addition, this pillar plays a role of the rigid membrane stopper to fix the membrane position in the "on"-state.

a. Previous design with one membrane per pixel (Prior Art);
b. New design, with two membranes facing each other; c. New design with mirror-like membrane bottom surfaces; d. New design with blackened membrane bottom surfaces; e. New design for the plane normal to the substrate plane and parallel to the membrane planes in the upright position.

Figure 4:
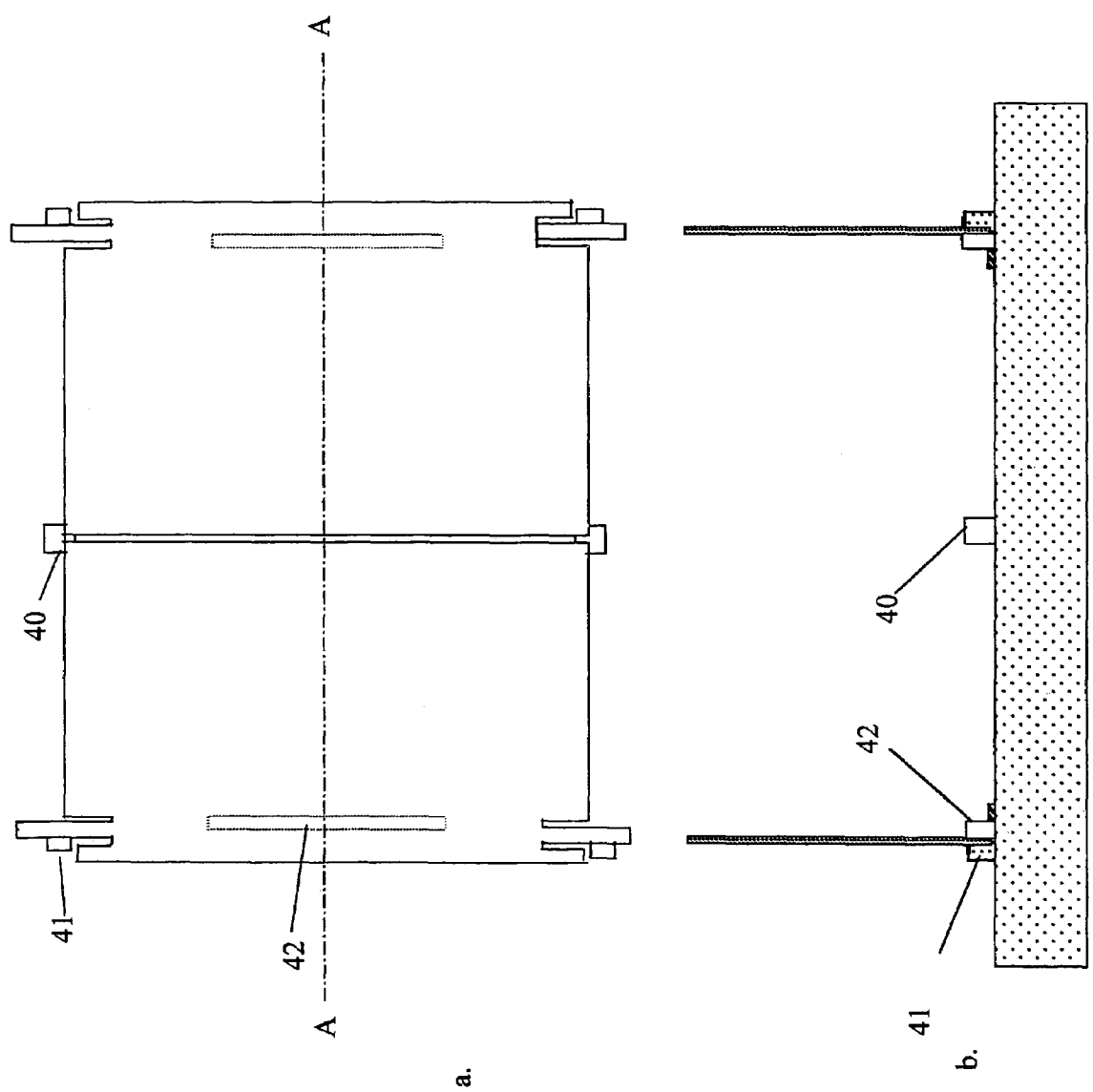

FIG. 4. shows the top (a) and cross-sectional (b) views of the pixel with an additional pillar.

DETAILED DESCRIPTION OF THE PREFERRED EMBODIMENTS

1. Increase of the Viewing Angle

Figure 1:
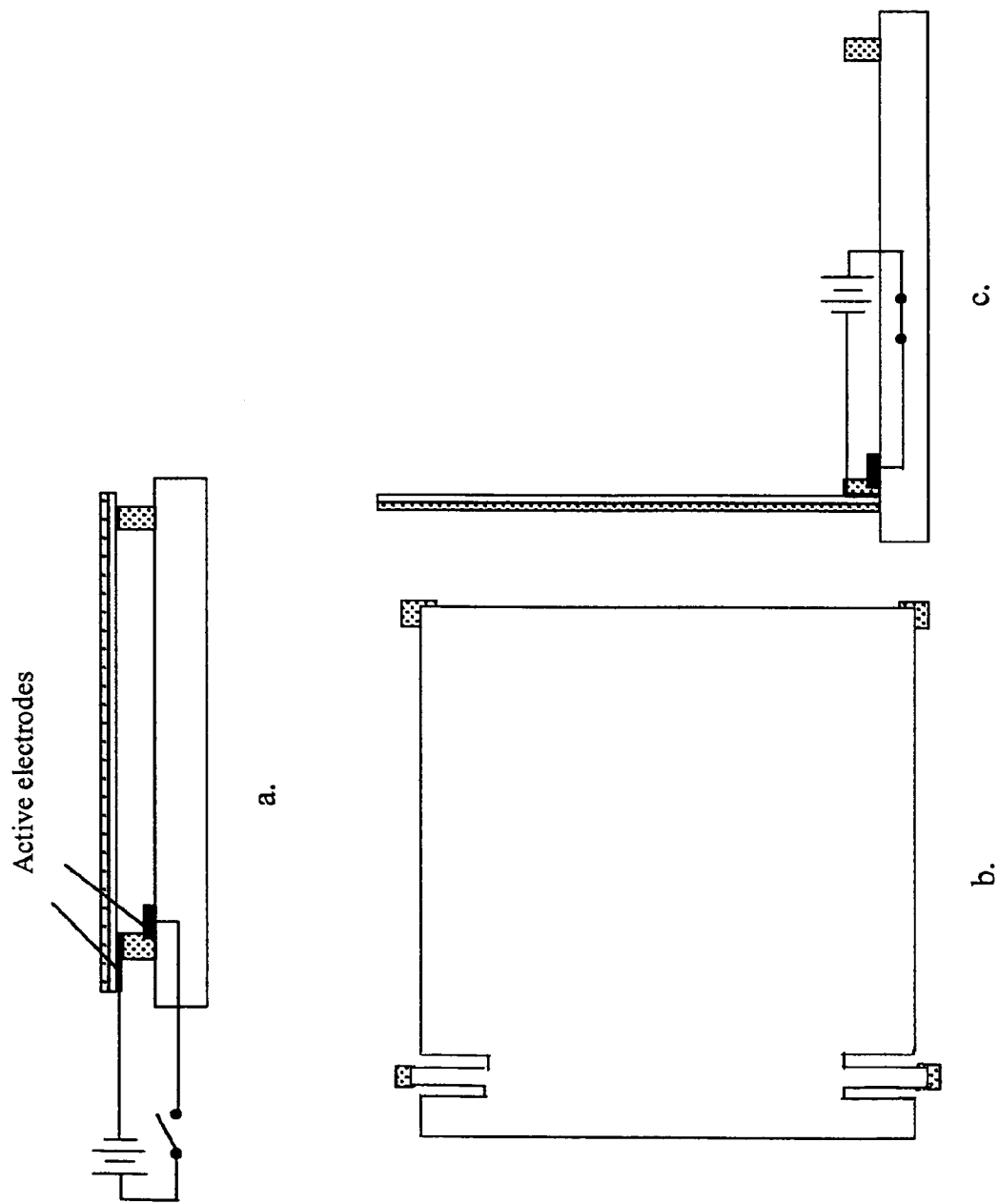
FIG. 1 shows as a Prior Art a cross-sectional (a, c) and top (b) view of the shutter, according to the U.S. Pat. No. 7,158,278.
Figure 2:
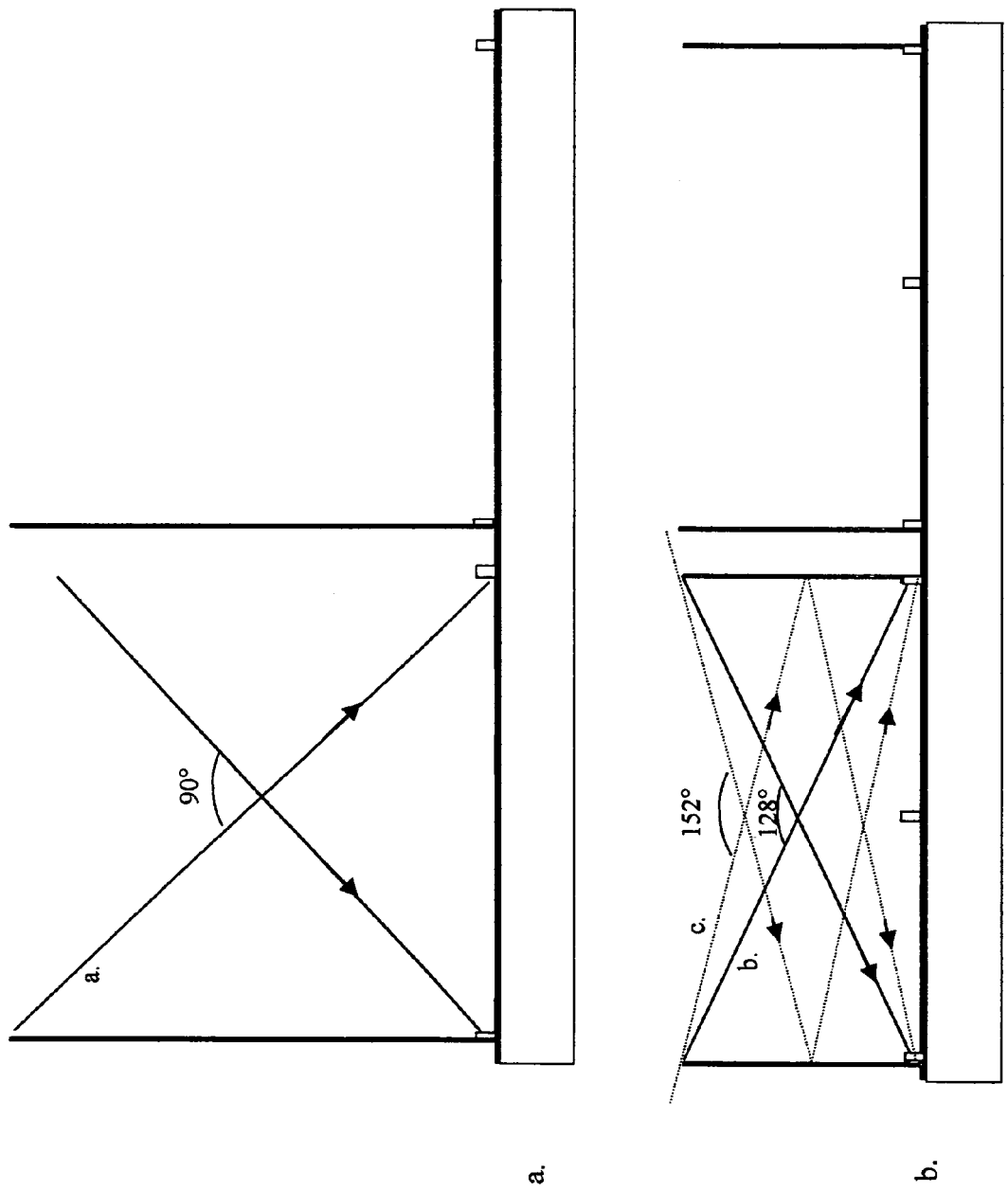
FIG. 2 shows the cross-sectional views of the previous (Prior Art) shutter design (a) and the new design (b) according to the present invention.

FIG. 2 illustrates changes in the pixel design aiming at increasing the display viewing angle. FIG. 2a shows two pixels as it was in original design of the previous patent, see FIG. 1. All membranes are in the up-right position ("on"-state), and all pixels in the array are positioned identically. In the plane of the drawing, the membranes prevent the view of the pixel interior. The maximum total viewing angle, as indicated by straight lines a. in the left pixel, in this case is 90°, beyond which the membranes entirely obscure the pixel sites (45° away from the direction normal to the substrate plane).

FIG. 2b shows new pixel design, according to the present invention, in which each pixel contains two membranes. The membranes are twice shorter and face each other, thereby providing larger viewing angle. The viewing angle for the complete pixel obscurity increases to ~128°, see below.

Further enhancement of the viewing angle arises when the membrane dielectric is covered underneath with a light reflecting metal, such as Al. In this case, when the membrane reached the upright position, the metal film plays a role of a mirror and reflects the pixel interior to the viewer. Such a mirror effect increases the total viewing angle. Shown in FIG. 2 b with the dashed line c. is the mirror enhanced maximum angle of ~152° beyond which the pixel site becomes invisible.

There is however even more efficient way to increase the viewing angle (not shown in FIG. 2b). It is based on making the color of the back surface of the membrane identical to the color of the pixel interior. If for example, the pixel site underneath the membrane is black, i.e. the pixel in the "on"-state is black, the black bottom membrane surface becomes exposed and contributes to the total black color of the pixel. The black layer must be in this case a film of dielectric to avoid an electrical short to the membrane electrode. Simple estimates show that the angle of the complete disappearance of the black color in this case is ~180°.

On the other hand, if the pixel in its "on"-state is chosen to be of a white color, and therefore the top membrane top surface is blackened, then the bottom membrane surface can be colored with a white paint or coated with Al film to add more white color to the pixel interior in the "on"-state.

It is important that in perpendicular viewing direction i.e. within the vertical plane parallel to the membrane planes, the viewing angle is unaffected by the membrane planes. Since an individual reader in the reading process typically tilts book within the vertical plane away from normal direction by 10-30°, it is preferable to retain maximum viewing angle within this plane. This implies that the membrane planes in their upright position should be made parallel to the vertical and normal to the substrate plane, as shown in FIG. 2.

Figure 3:
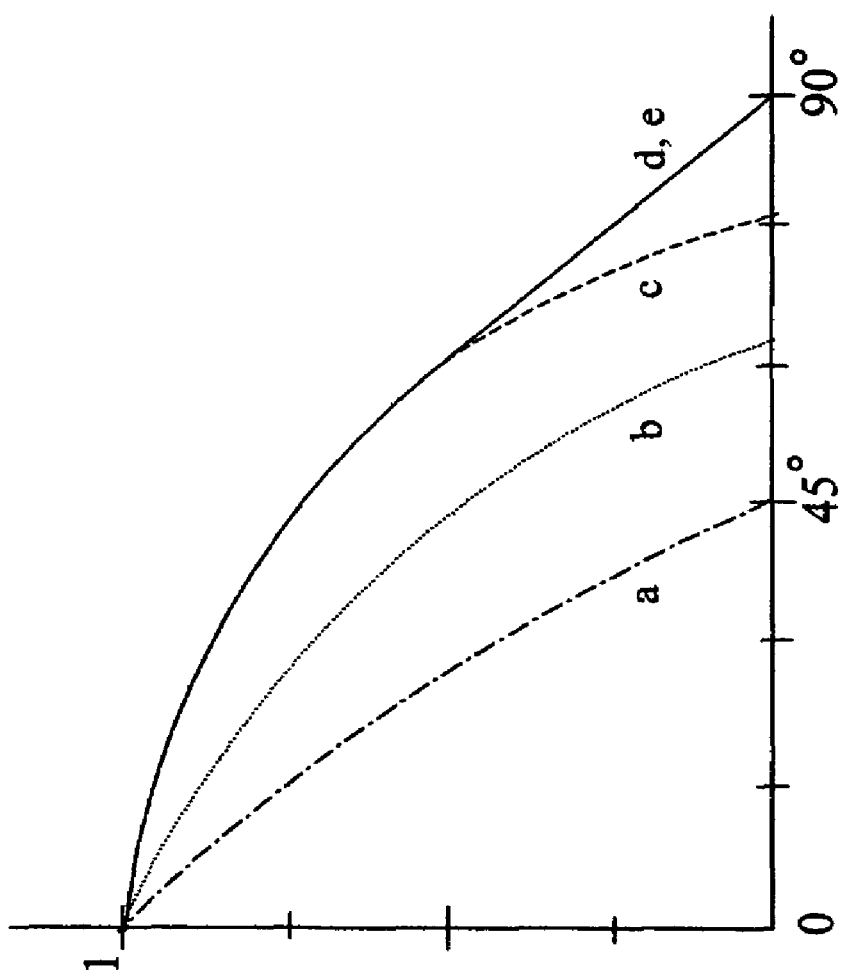
FIG. 3 shows the normalized angle dependencies of the opened pixel.

FIG. 3 shows the results of calculation for the normalized blackness of the opened pixel, which is defined as black pixel area visible by a viewer, as a function of the viewing angle α measured from the direction normal to the substrate. Four different pixel designs and two viewing directions are considered. In all cases presented, the black pixel area visible by a viewer is normalized to 1 at α=0 and is proportional to cos α. Curve a. in FIG. 3 represents the angle dependence for the previous design (shown in FIG. 2a) for the case when the viewing angle varies in the plane of the drawing. As pointed out above, the pixel blackness quickly decays with the angle, and at α=45° black area within the pixel becomes invisible.

The curves b, c and d show the angle dependencies in the same plane as in curve a. for different pixel designs, according to the present invention: b—for the pixel structure of FIG. 2b, where each pixel has two membranes facing each other; c—for the same pixel structure as in b. and mirror-like membrane back surfaces; d—for the same pixel structure as in b. and blackened membrane surfaces. Finally, the curve e. shows the angle dependence in the perpendicular to the drawing and vertical plane in FIG. 1, when the membranes do not affect the pixel observation.

Curve b. shows significant improvement in comparison with the previous design of curve a. yielding the angle of complete pixel interior obscure $\alpha_{ob}$=64°. Even better results are obtained for mirror-like membrane surfaces, yielding $\alpha_{ob}$=76°. Finally, for the blackened back membrane surface one obtains the curve d. that is very close to the curve e. in which the viewing angle is unaffected by the presence of the opened membranes. Thus, the proposed pixel modifications essentially eliminate the problem of limited viewing angle existed in the previous display design.

2. Placement of the Membrane Stopper

In the original design, see FIG. 1, four pillars support the membrane, with each pillar being shared by two neighboring pixels. In the new design, shown in FIG. 4a for two pixels in the "off"-state, the membranes and pillars of two pixels are turned toward each other to enhance the viewing angle, as discussed in the previous paragraph. In this case, the pillars 40, designated for the membrane support only, are shared by four pixels. Two other pillars 41, shared by two pixels, are attached to the membrane through the hinges used for both the membrane rotation and electrical connection of the pixels in vertical direction to form the column conducting lines through the display.

The key new element, according to the present invention, is additional, fifth, pillar 42 located on the substrate in the area of the membrane electrode. The role of this pillar is two-fold:
i. It facilitates the membrane rotation under electrostatic force: without it, the membrane may have a tendency of sagging toward the substrate electrode instead of tilting.
ii. It serves as a membrane stopper to stop the membrane in the vertical position.

Dashed lines in FIG. 4a show the location and dimensions of the fifth, stopper-pillars. FIG. 4b shows the device cross-section along the plane AA with the membranes in upright position, which demonstrates all three pillars, 40, 41 and 42, having different functions in the display structure.

What is claimed is:

1. A display device, comprised of two-dimensional matrix of pixels, each pixel representing an optical electromechanical shutter comprised of:
   a substrate;
   two membranes placed on four pillars parallel to and above the substrate plane and covering the entire pixel area, each of said two membranes occupying a half of the pixel area, wherein longer sides of said two membranes are attached to two of said four pillars through torsion hinges at the opposite sides of the pixel area, while said two membranes are composed of the following elements:
      first conducting electrode facing said substrate and attached to said two pillars of said four pillars through said torsion hinges made from the same material as said conducting electrode, said first conducting electrode being placed at the membrane edge in the shape of a stripe parallel to said membrane edge and has the width less than the depth of the air gap existing between said substrate and said membranes, so that said membranes are capable of rotating around said torsion hinges and reaching position at which the shortest sides of said membranes become normal to the substrate plane;
      layer of insulator above said conducting electrode;
      light reflecting layer on top of said insulator;
   second conducting electrode placed on said substrate underneath said first conducting electrode on said membrane and made as a stripe parallel to said first conducting electrode, so that under application of appropriate potential difference between said first and second conducting electrodes said two membranes can switch electro-statically to the position normal to said substrate plane, thereby changing the pixel optical state, wherein said two membranes in said position normal to said substrate plane are parallel to each other, face each other and located at the opposite sides of each pixel area thereby producing the enclosed pixel interior and thus making viewing angle of every pixel independent of neighboring pixels;
   appropriate set of conductive lines connected to said first and second conductive electrodes for application of a voltage to the pixel matrix.

2. The display device of claim 1, wherein, both said bottom surfaces of said two membranes and the pixel interior underneath the membranes are coated with a black film.

3. The display device of claim 1, wherein an additional membrane supporting pillar is placed on the substrate for each membrane of the pixel near the axis of membrane rotation to facilitate the membrane rotation under the electric field and stop and hold the membranes in said position normal to said substrate plane.

* * * * *